US011190060B2

(12) United States Patent
Shichino

(10) Patent No.: US 11,190,060 B2
(45) Date of Patent: Nov. 30, 2021

(54) POWER RECEIVING APPARATUS, POWER TRANSMISSION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/065,933

(22) Filed: Oct. 8, 2020

(65) Prior Publication Data

US 2021/0028654 A1 Jan. 28, 2021

Related U.S. Application Data

(63) Continuation of application No. 16/373,819, filed on Apr. 3, 2019, now Pat. No. 10,840,747.

(30) Foreign Application Priority Data

Apr. 9, 2018 (JP) .............................. JP2018-074991

(51) Int. Cl.
*H02J 50/80* (2016.01)
*H02J 7/02* (2016.01)
*H02J 50/10* (2016.01)
*H04W 4/80* (2018.01)
*H04W 76/10* (2018.01)

(52) U.S. Cl.
CPC .............. *H02J 50/80* (2016.02); *H02J 7/025* (2013.01); *H02J 50/10* (2016.02); *H04W 4/80* (2018.02); *H04W 76/10* (2018.02)

(58) Field of Classification Search
CPC .. H02J 50/80; H02J 50/10; H02J 7/025; H02J 7/02; H04W 4/80; H04W 76/10
See application file for complete search history.

(56) References Cited

FOREIGN PATENT DOCUMENTS

JP 2012217224 A 11/2012

OTHER PUBLICATIONS

Notice of Allowance issued in U.S. Appl. No. 16/373,819 dated Jul. 10, 2020.

*Primary Examiner* — Robert L Deberadinis
(74) *Attorney, Agent, or Firm* — Rossi, Kimms & McDowell LLP

(57) ABSTRACT

A power receiving apparatus, which has a first communication function and a second communication function, controls the first communication function to receive a first signal including information representing whether a power transmission apparatus can execute control communication using a second method, controls, based on the information representing that the power transmission apparatus can execute the control communication using the second method, the first communication function to transmit, to the power transmission apparatus, a second signal to request identification information of the power transmission apparatus for the communication of the second method and receive the identification information from the power transmission apparatus, and determines which one of the first communication function and a second communication function should be used for the control communication, based on the first signal and whether the identification information is received.

41 Claims, 8 Drawing Sheets

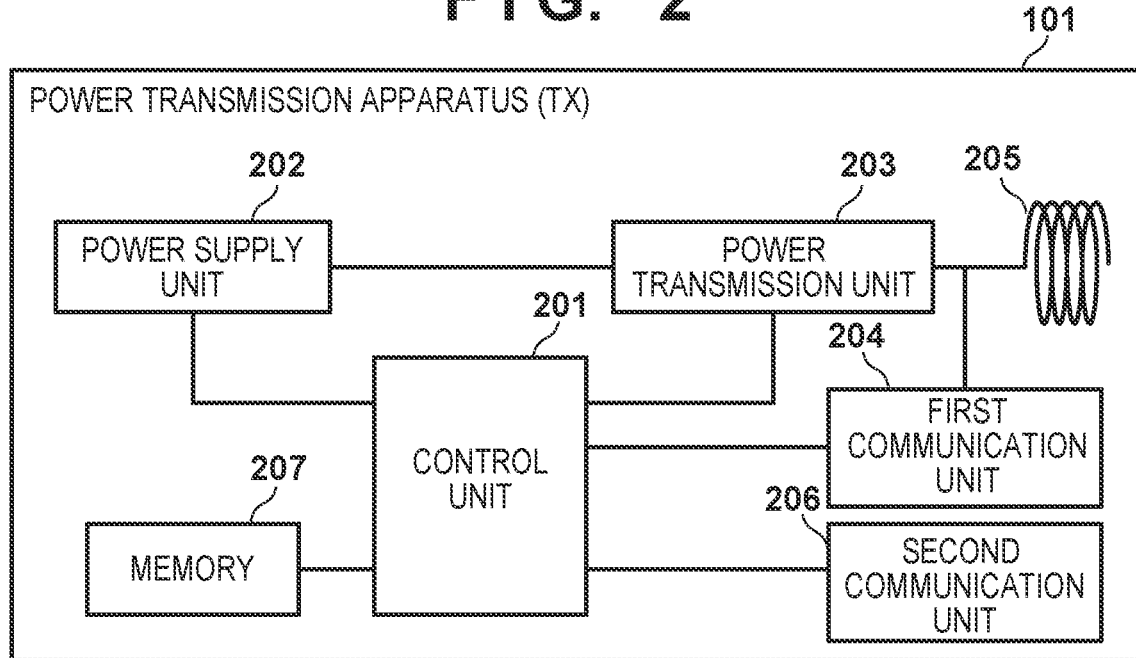
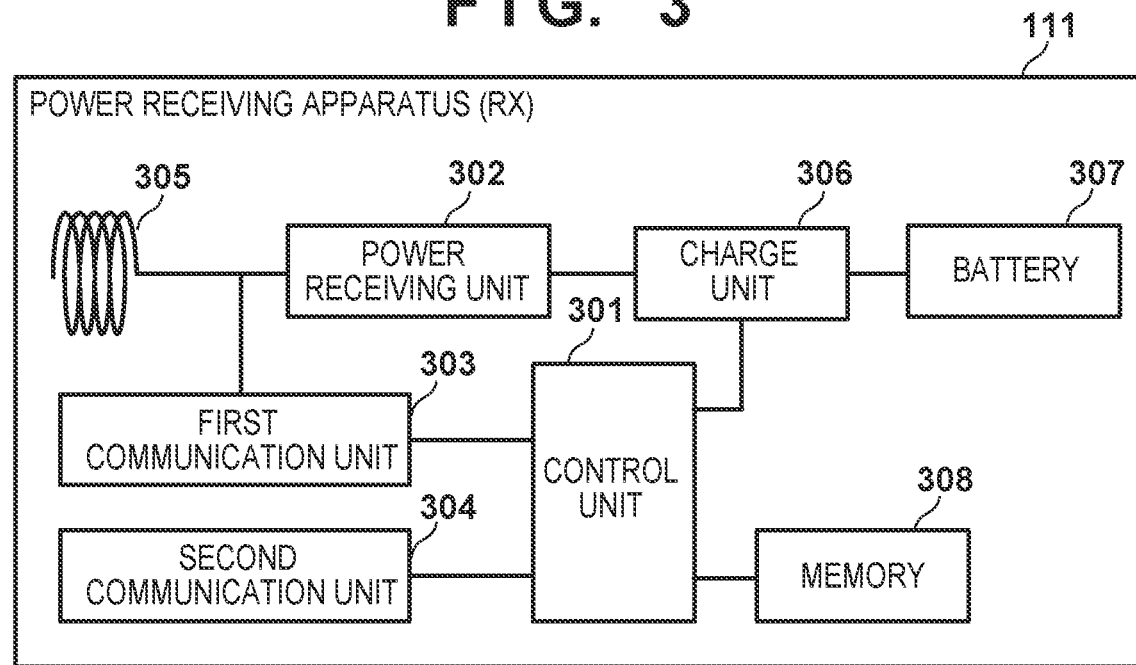

POWER RECEIVING APPARATUS, POWER TRANSMISSION APPARATUS, CONTROL METHOD, AND NON-TRANSITORY COMPUTER-READABLE STORAGE MEDIUM

This application is a continuation application of U.S. application Ser. No. 16/373,819 filed on Apr. 3, 2019, issued as U.S. Pat. No. 10,840,747 on Nov. 17, 2020, which claims the benefit of Japanese Patent Application No. 2018-074991, filed Apr. 9, 2018 which are hereby incorporated by reference herein in their entirety.

BACKGROUND OF THE INVENTION

Field of the Invention

The present invention relates to a control communication technique in wireless power transmission.

Description of the Related Art

Technological development of a wireless power transmission system including a power transmission apparatus and a power receiving apparatus has been widely conducted. Japanese Patent Laid-Open No. 2012-217224 describes a method of performing transmission/reception of control signals used at the time of power transmission/reception by so-called out-band communication using frequencies, coils, and antennas which are different from those used for the power transmission/reception in a power transmission system.

In a standard (WPC standard) established by WPC (Wireless Power Consortium) that is the standardization organization of wireless power transmission standard, power transmission/reception and control communication therefor are performed by magnetic induction. In addition, a power transmission apparatus and a power receiving apparatus, which comply with the current WPC standard, perform control communication using the same frequency as the frequency used in power transmission/reception. The control communication is so-called in-band communication performed via coils used in power transmission/reception. Note that a communication range in which errorless communication can be performed in in-band communication is narrower than the communication range of out-band communication.

Considering a power transmission apparatus and a power receiving apparatus each capable of executing both in-band communication and out-band communication, appropriate control communication in the power transmission apparatus and the power receiving apparatus has not been examined.

SUMMARY OF THE INVENTION

The present disclosure provides an appropriate communication control technique in a power receiving apparatus and a power transmission apparatus each capable of executing both in-band communication and out-band communication.

According to one aspect of the present disclosure, there is provided a power receiving apparatus comprising: a power receiving unit configured to wirelessly receive a power from a power transmission apparatus; a first communication unit configured to perform communication of a first method using a first frequency to be used for power transmission; a second communication unit configured to perform communication of a second method using a second frequency different from the first frequency; and a control unit configured to control the first communication unit and the second communication unit to perform control communication for the power transmission, wherein the control unit controls the first communication unit to receive a first signal including information representing whether the power transmission apparatus can execute the control communication by the communication of the second method, controls, based on that the information included in the first signal received by the first communication unit represents that the power transmission apparatus can execute the control communication by the communication of the second method, the first communication unit to transmit, to the power transmission apparatus, a second signal to request identification information of the power transmission apparatus for the communication of the second method and receive the identification information from the power transmission apparatus, and determines which one of the first communication unit and the second communication unit should be used for the control communication, based on the first signal received by the first communication unit and whether the identification information is received by the first communication unit.

According to another aspect of the present disclosure, there is provided a power transmission apparatus comprising: a power transmission unit configured to wirelessly transmit a power to a power receiving apparatus; a first communication unit configured to perform communication of a first method using a first frequency to be used for power transmission; a second communication unit configured to perform communication of a second method using a second frequency different from the first frequency; and a control unit configured to control the first communication unit and the second communication unit to perform control communication for the power transmission, wherein the control unit controls the first communication unit to receive a first signal including information representing whether the power receiving apparatus can execute the control communication by the communication of the second method, and determines which one of the first communication unit and the second communication unit should be used for the control communication, based on the information included in the first signal received by the first communication unit.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 2 is a block diagram showing an example of the arrangement of a power transmission apparatus;

FIG. 3 is a block diagram showing an example of the arrangement of a power receiving apparatus;

DESCRIPTION OF THE EMBODIMENTS

An exemplary embodiment(s) of the present disclosure will now be described in detail with reference to the drawings. It should be noted that the relative arrangement of the components, the numerical expressions and numerical values set forth in these embodiments do not limit the scope of the present disclosure unless it is specifically stated otherwise.

(System Arrangement)

Figure 1:
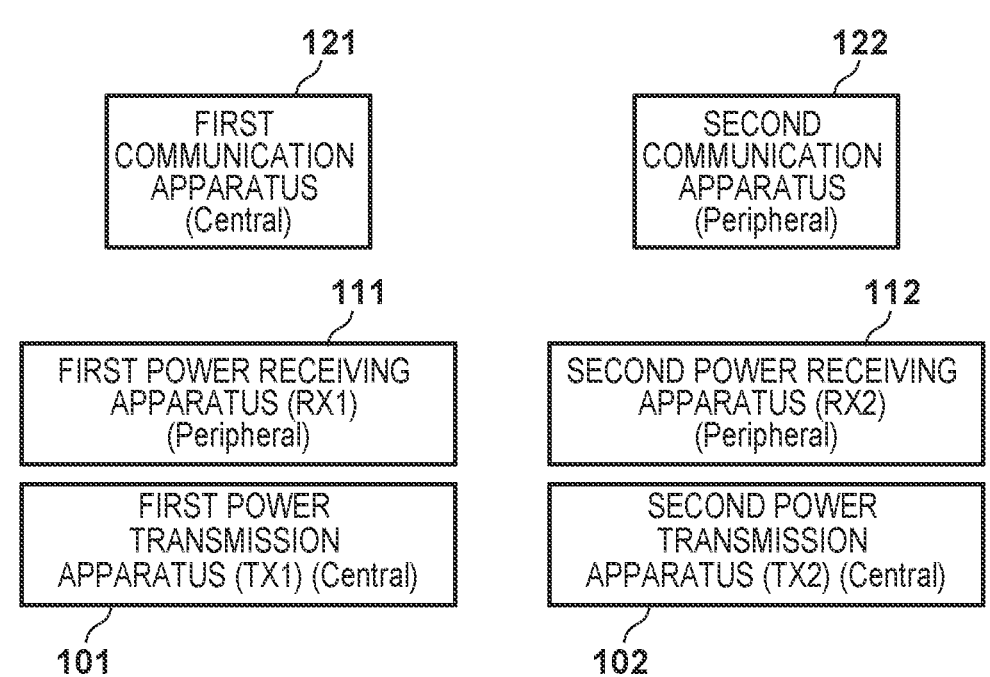
FIG. 1 is a block diagram showing an example of the arrangement of a wireless power transmission system.

FIG. 1 shows a wireless charge system according to this embodiment. The wireless charge system includes power transmission apparatuses (a first power transmission apparatus 101 and a second power transmission apparatus 102) and power receiving apparatuses (a first power receiving apparatus 111 and a second power receiving apparatus 112). Note that the first power transmission apparatus 101 and the first power receiving apparatus 111 will sometimes be referred to as "TX1" and "RX1", respectively, and similarly, the second power transmission apparatus 102 and the second power receiving apparatus 112 will sometimes be referred to as "TX2" and "RX2", respectively, hereinafter. Note that each of the power transmission apparatuses and the power receiving apparatuses has a communication function by Bluetooth® Low Energy (BLE). Additionally, as an example, other apparatuses (a first communication apparatus 121 and a second communication apparatus 122) each of which has the communication function by the BLE but not the function of wireless power transmission exist on the periphery of the wireless charge system. Note that a communication unit (a unit formed by an antenna, a communication circuit, and the like) of the BLE will sometimes be referred to as "BLE" hereinafter.

Here, as shown in FIG. 1, each of the TX1 and the TX2 functions as a Central of the BLE, and each of the RX1 and the RX2 functions as a Peripheral of the BLE. In addition, the first communication apparatus 121 functions as a Central, and the second communication apparatus 122 functions as a Peripheral. Note that the "Central" represents a control station of the BLE, and the "Peripheral" represents a terminal station of the BLE. A Central of the BLE performs communication with a Peripheral of the BLE but not communication with another Central. In addition, a Peripheral of the BLE performs communication with a Central of the BLE but not communication with another Peripheral. That is, in the BLE, communication between Centrals or between Peripherals is not performed. In addition, a Central can be in a connected state (CONNECT_State of the BLE) with a plurality of Peripherals and can transmit/receive data to/from a plurality of Peripherals. On the other hand, a Peripheral can be in a connected state with only one Central and cannot communicate with a plurality of Centrals in parallel.

In FIG. 1, when viewed from the TX1, the RX1 is located within the power transmission/reception range, but the RX2 is not located within the power transmission/reception range. Hence, the TX1 performs wireless power transmission only to the RX1 but not power transmission to the RX2.

In this case, if the TX1 should perform control communication by out-band communication using the BLE and transmit power to the RX1, the BLE (Central) of the TX1 needs to be in the connected state with at least the BLE (Peripheral) of the RX1. Since a Central of the BLE can simultaneously be in the connected state with a plurality of Peripherals, as described above, the BLE (Central) of the TX1 may be in the connected state not only with the RX1 but also with the RX2 and the second communication apparatus 122, which function as the Peripherals. Similarly, the BLE (Central) of the TX2 may be in the connected state with the RX1 and the second communication apparatus 122 as long as it is in the connected state with the BLE (Peripheral) of the RX2.

On the other hand, the BLE (Peripheral) of the RX1 can be connected with only one Central. For this reason, to perform control communication for power transmission between the TX1 and the RX1 by the BLE, the BLE (Peripheral) of the RX1 needs to be in the connected state only with the BLE (Central) of the TX1. This is because when the BLE (Peripheral) of the RX1 is in the connected state with another BLE (Central) such as the TX2 or the first communication apparatus 121, control communication with the BLE (Central) of the TX1 cannot be performed. Similarly, to perform control communication for power transmission between the TX2 and the RX2 by the BLE, the BLE (Peripheral) of the RX2 needs to be in the connected state only with the BLE (Central) of the TX2. Hence, the BLE (Peripheral) of the RX2 should not be in the connected state with another BLE (Central) such as the TX1 or the first communication apparatus 121.

As described above, the control communication should be performed between a power transmission apparatus and a power receiving apparatus (for example, the TX1 and the RX1) for which power transmission/reception is to be executed. However, when the communication range of out-band communication is wider than the communication range of in-band communication, the power transmission apparatus and the power receiving apparatus sometimes establish connection for out-band communication with an apparatus that is not the power transmission/reception target. Such establishment of connection for out-band communication with an apparatus that is not the power transmission/reception target will be referred to as cross connection. For example, a state in which the RX1 is BLE-connected with the TX2 or the first communication apparatus 121 in FIG. 1 is the cross connection.

Referring to FIG. 1, when using the BLE (out-band communication) as control communication, if there is no proof for BLE connection with the RX1 located within the power transmission/reception range, the TX1 should not perform transmission of a power to charge the battery of the RX1, a negotiation concerning the power, and the like. If the TX1 sets the RX1 as the power transmission target but establishes BLE connection with the RX2 or the second communication apparatus 122 and performs control communication, the power transmission target (RX1) and the partner apparatus (the RX2 or the second communication apparatus 122) of the control communication may be different. In this case, the TX1 cannot perform appropriate control communication for the RX1. Similarly, when using control communication by the BLE (out-band communication), if there is no proof for BLE connection with the TX1 located within the power transmission/reception range, the RX1 should not perform reception of a power from the TX1 to charge the battery, a negotiation concerning the power, and the like. If the RX1 sets the TX1 as the power reception source but establishes BLE connection with the TX2 or the first communication apparatus 121 and performs control communication, the power reception source (TX1) and the partner apparatus (the TX2 or the first communication apparatus 121) of the control communication may be different. In this case, the RX1 cannot perform appropriate control communication with the TX1.

As described above, in the wireless power transmission system shown in FIG. 1, it is important that both the power transmission apparatus and the power receiving apparatus obtain a proof that they can perform control communication by the BLE with the partner apparatus located within the power transmission/reception range before transmission/reception of a power to charge the battery or a negotiation concerning the power. Hence, this embodiment enables each of the power transmission apparatus and the power receiving apparatus to establish connection by the BLE with the partner apparatus of wireless power transmission. Note that the BLE is merely an example, and an arbitrary wireless communication method usable for out-band communication in wireless power transmission can be used. In addition, the wireless power transmission to be executed is assumed to comply with the WPC standard, and the WPC standard here includes a function defined by version 1.2.2. Note that in this embodiment, a description will be made assuming that the power transmission apparatus and the power receiving apparatus comply with the WPC standard. However, the present disclosure is not limited to this, and the standard may be another wireless power transmission standard. An example of the arrangement of each of the power transmission apparatus and the power receiving apparatus and an example of the procedure of processing to be executed will be described below.

(Apparatus Arrangement)

FIG. 2 is a block diagram showing an example of the arrangement of the power transmission apparatus (for example, the TX1 and the TX2). The power transmission apparatus includes, for example, a control unit 201, a power supply unit 202, a power transmission unit 203, a first communication unit 204, a power transmission coil 205, a second communication unit 206, and a memory 207.

The control unit 201 controls the entire power transmission apparatus. As one example, the control unit 201 includes at least one processor such as a CPU (Central Processing Unit) or an MPU (Micro Processing Unit). Note that the control unit 201 may include an ASIC (Application Specific Integrated Circuit), an FPGA (Field Programmable Gate Array), or the like configured to execute processing to be described later.

The power supply unit 202 is a power supply that supplies a power when at least the control unit 201 and the power transmission unit 203 operate. The power supply unit 202 can be, for example, a wired power receiving circuit, a battery, or the like configured to receive supply of a power from a commercial power supply. The power transmission unit 203 causes the power transmission coil 205 to generate an alternating voltage and an alternating current to transmit a power to the power receiving apparatus via the power transmission coil 205. The power transmission unit 203 converts, for example, a direct voltage supplied from the power supply unit 202 into an alternating voltage using a switching circuit having a half-bridge or full-bridge structure using an FET. In this case, the power transmission unit 203 includes a gate driver configured to on/off-control the FET.

The first communication unit 204 performs control communication for wireless power transmission based on the WPC standard with a communication unit (a first communication unit 303 shown in FIG. 3) of the power receiving apparatus. In this embodiment, the communication executed by the first communication unit 204 is so-called in-band communication (communication by a first method) that modulates the alternating voltage or current generated by the power transmission unit 203 and superimposes communication target data on wireless power. Additionally, in this embodiment, when using only in-band communication for control communication, the power transmission apparatus can supply a power to output a power of 15 W at maximum to the charge unit of the power receiving apparatus that similarly uses in-band communication.

The second communication unit 206 performs control communication for wireless power transmission based on the WPC standard with a communication unit (a second communication unit 304 shown in FIG. 3) of the power receiving apparatus. The second communication unit 206 performs so-called out-band communication (communication by a second method) in which a frequency different from the frequency of the power transmission unit 203 is used, and an antenna (not shown) different from the power transmission coil 205 is used. In this embodiment, the second communication unit 206 is compliant with the BLE. Instead, a communication unit compliant with another wireless communication method such as NFC or WiFi may be used.

Note that in this embodiment, when out-band communication is used for control communication with the power receiving apparatus, the power transmission apparatus can supply a larger power to the power receiving apparatus as compared to a case in which in-band communication is used. For example, when performing control communication by out-band communication, the power transmission apparatus can supply a power such that the power output to the charge unit of the power receiving apparatus becomes 100 W at maximum. In in-band communication, small voltage and current changes are superimposed on transmission power for communication. On the other hand, when the transmission power becomes large, noise generated from the power transmission unit or the power receiving unit becomes large. For this reason, when in-band communication is used, the transmission power is limited such that the communication unit of in-band communication can detect the small voltage and current changes for communication. On the other hand, when using out-band communication, the amount of the power to be transmitted can be made large because such a limitation is absent.

The memory 207 stores the states of the whole and the elements of the power transmission apparatus and the wireless power transmission system.

In FIG. 2, the control unit 201, the power supply unit 202, the power transmission unit 203, the first communication unit 204, the memory 207, and the second communication unit 206 are illustrated as separate blocks. However, two or more of the blocks may be integrated by one chip or the like. Also, one block may be divided into a plurality of blocks.

FIG. 3 is a block diagram showing an example of the arrangement of the power receiving apparatus (for example, the RX1 and the RTX2). The power receiving apparatus includes, for example, a control unit 301, a power receiving unit 302, the first communication unit 303, the second communication unit 304, a power receiving coil 305, a charge unit 306, a battery 307, and a memory 308.

The control unit 301 controls the entire power receiving apparatus. As one example, the control unit 301 includes at least one processor such as a CPU (Central Processing Unit) or an MPU (Micro Processing Unit). Note that the control unit 301 may include an ASIC (Application Specific Integrated Circuit), an FPGA (Field Programmable Gate Array), or the like configured to execute processing to be described later.

The power receiving unit 302 obtains an alternating voltage and an alternating current generated in the power receiving coil 305 by a position transmitted from the power transmission coil 205, and converts the received power into a direct voltage and a direct current to operate the control unit 301, the charge unit 306, and the like. The first communication unit 303 performs control communication for wireless power transmission based on the WPC standard with the first communication unit 204 of the power transmission apparatus. The control communication is performed by in-band communication (communication by the first method) that performs load modulation of an electromagnetic wave received by the power receiving coil 305. In this embodiment, when using only in-band communication for control communication with the power transmission apparatus, the power receiving apparatus can wirelessly receive a power from the power transmission apparatus, and output a power of 15 W at maximum to the charge unit 306.

The second communication unit 304 performs control communication for wireless power transmission based on the WPC standard with the second communication unit 206 of the power transmission apparatus. The second communication unit 304 performs out-band communication (communication by the second method) using a frequency different from the frequency of the electromagnetic wave received by the power receiving unit 302 and an antenna (not shown) different from the power receiving coil 305. In this embodiment, the second communication unit 304 is compliant with the BLE. Instead, a communication unit compliant with another wireless communication method such as NFC or WiFi may be used. In addition, the second communication unit 304 may receive power supply from the battery 307, or may directly receive power supply from the power receiving unit 302 without an intervention of the battery 307. Note that in this embodiment, when out-band communication is used for control communication with the power transmission apparatus, the power receiving apparatus can wirelessly receive a power from the power transmission apparatus and output a power of 100 W at maximum to the charge unit 306.

The charge unit 306 charges the battery 307 using the direct voltage and the direct current supplied from the power receiving unit 302. The memory 308 stores the states of the whole and the elements of the power receiving apparatus and the wireless power transmission system.

In FIG. 3, the control unit 301, the power receiving unit 302, the first communication unit 303, the second communication unit 304, the charge unit 306, and the memory 308 are illustrated as separate blocks. However, two or more of the blocks may be integrated by one chip or the like. Also, one block may be divided into a plurality of blocks.

Note that "the power transmission apparatus or power receiving apparatus is compliant with control communication by out-band communication" will be expressed as "compliant with a version A of the WPC standard" hereinafter. The version A of the WPC standard is a standard that replaces WPC v1.2.2, and at least a control communication function by out-band communication is added.

(Procedure of Processing)

An example of the procedure of processing executed by each apparatus will be described next, and an example of the procedure of processing of the entire system will be described after that.

[Operation of Power Transmission Apparatus]

An example of the procedure of processing executed by the power transmission apparatus (TX1) will be described below with reference to FIGS. 4A and 4B. Note that this processing can be started when the power transmission unit 203 receives power supply from the power supply unit 202, and the power transmission apparatus is thus activated. In addition, this processing can be implemented when the control unit 201 executes a program stored in the memory 207. However, the present disclosure is not limited to this, and this processing may be executed when the power transmission function is activated by, for example, a user operation such as pressing of a predetermined button. In addition, at least part of the processing shown in FIGS. 4A and 4B may be implemented by hardware. When at least part of the processing is implemented by hardware, for example, a dedicated circuit automatically generated on an FPGA using a predetermined compiler from a program configured to implement the processing steps can be used. Alternatively, hardware configured to execute a predetermined processing step may be implemented by a Gate Array circuit, like the FPGA.

When this processing is started, the TX1 starts processing complying with the WPC standard. In the WPC standard, a partner apparatus is specified by a selection phase, a ping phase, and an identification & configuration phase (to be referred to as an "I & C phase" hereinafter). Then, in a negotiation phase, a negotiation concerning a transmission power is executed. After that, a calibration phase for power transmission is executed, and then, processing of a power transfer phase (to be referred to as a "PT phase" hereinafter) for performing actual power transmission is executed.

Figure 4A:
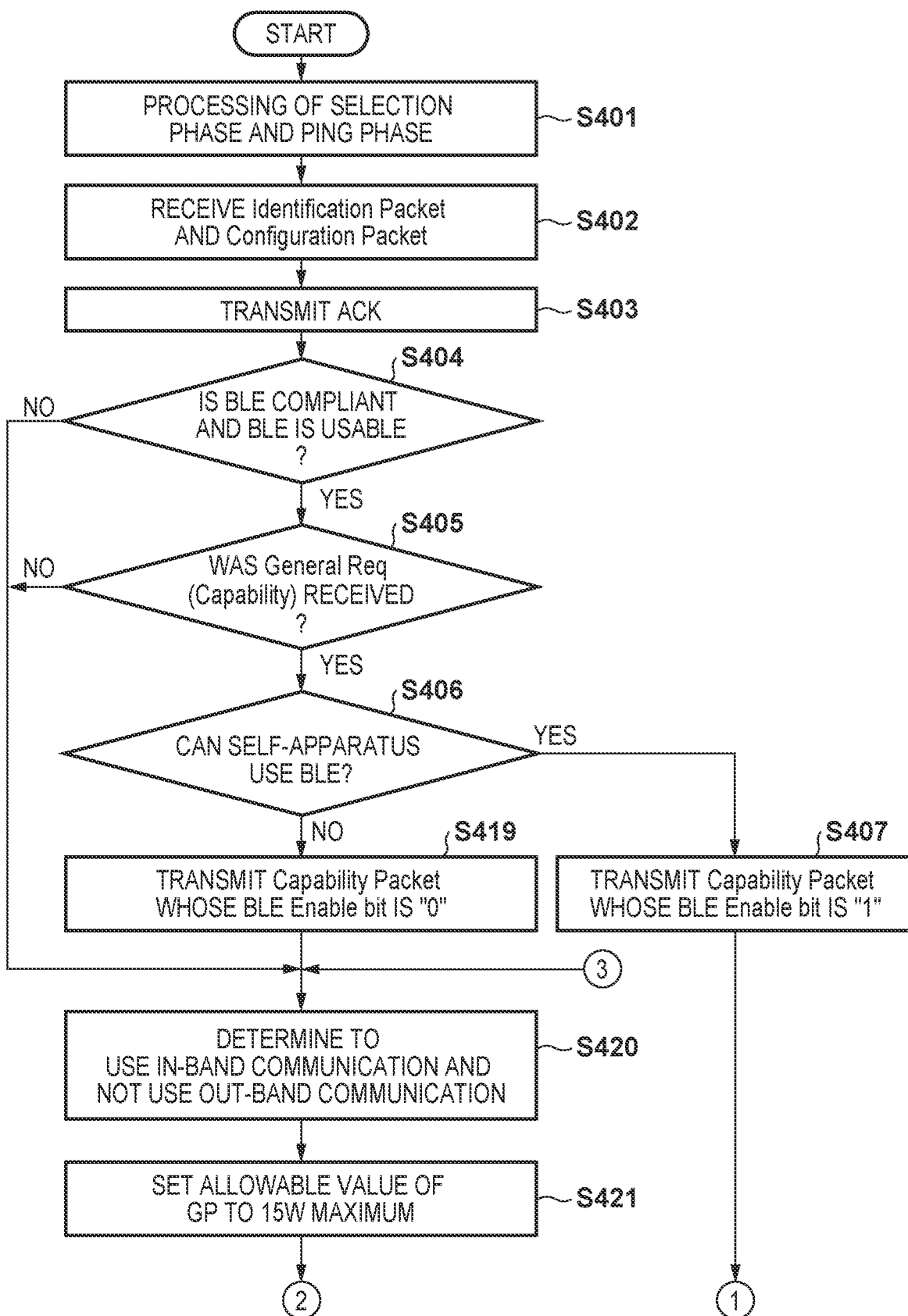
FIGS. 4A and 4B illustrate a flowchart showing an example of the procedure of processing of the power transmission apparatus.
Figure 4B:
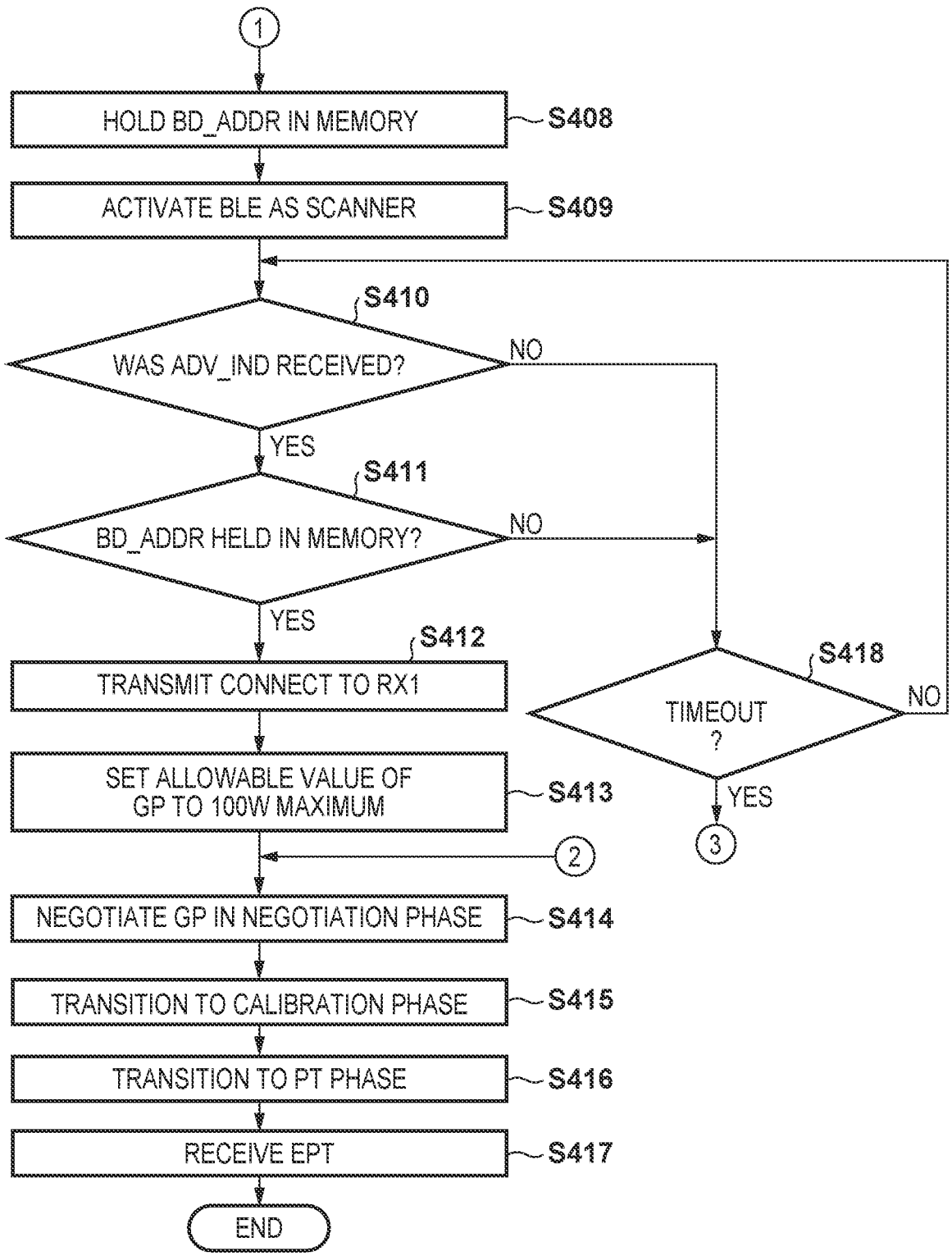

Referring to FIGS. 4A and 4B, the TX1 first executes the processing of the selection phase and the ping phase (step S401). In the selection phase, the TX1 transmits Analog Ping via the power transmission coil 205. The Analog Ping is a small power used to detect an object existing near the power transmission coil 205. The TX1 detects the voltage value or current value of the power transmission coil at the time of transmission of the Analog Ping. If the voltage is less than a threshold, or if the current value exceeds a threshold, it is determined that an object exists in the neighborhood, and the phase transitions to the ping phase. In the ping phase, the TX1 transmits a Digital Ping whose power is larger than the Analog Ping. Here, the Digital Ping has a power enough to activate the control unit 301, the first communication unit 303, and the second communication unit 304 of the RX1 existing near the power transmission coil 205. When the control unit 301 and the first communication unit 303 of the RX1 are activated by the Digital Ping received via the power receiving coil 305, the RX1 notifies the TX1 of the magnitude of the received voltage by in-band communication by the first communication unit 303. Upon receiving the notification of the received voltage value via the first communication unit 204, the TX1 ends the processing of the ping phase and transitions to the I & C phase. In the I & C phase, the TX1 receives an Identification Packet transmitted by the RX1 (step S402). At this time, the TX1 can obtain information representing whether the RX1 that is the transmission source of the packet is compliant with the version A of the WPC standard, the individual identification information of the RX1 used at least in the WPC standard of a version before the version A, and identification information used in the BLE. In one example, the TX1 obtains, in the Identification Packet, identification information used by the RX1 in the WPC standard, and confirms whether an EXT bit representing that additional ID information exists is "1". If the EXT bit is "1", the TX1 obtains the additional ID information by an Extended Identification Packet transmitted next in accordance with the WPC standard. In this embodiment, the Extended Identification Packet stores an 8-byte Bluetooth Device Address used by the RX1 in the BLE. Note that the Bluetooth Device Address will be referred to as "BD_ADDR" hereinafter. The BD_ADDR is a Public Address defined by the BLE standard and representing, for example, the manufacturer of the RX1 of the individual identification information of the communication function (second communication unit 304) in the BLE. At this point of time, the TX1 can recognize that the identification information of the RX1, which is used in the WPC standard, corresponds to the identification information in the BLE (the pieces of identification information concern the same apparatus).

Figure 7:
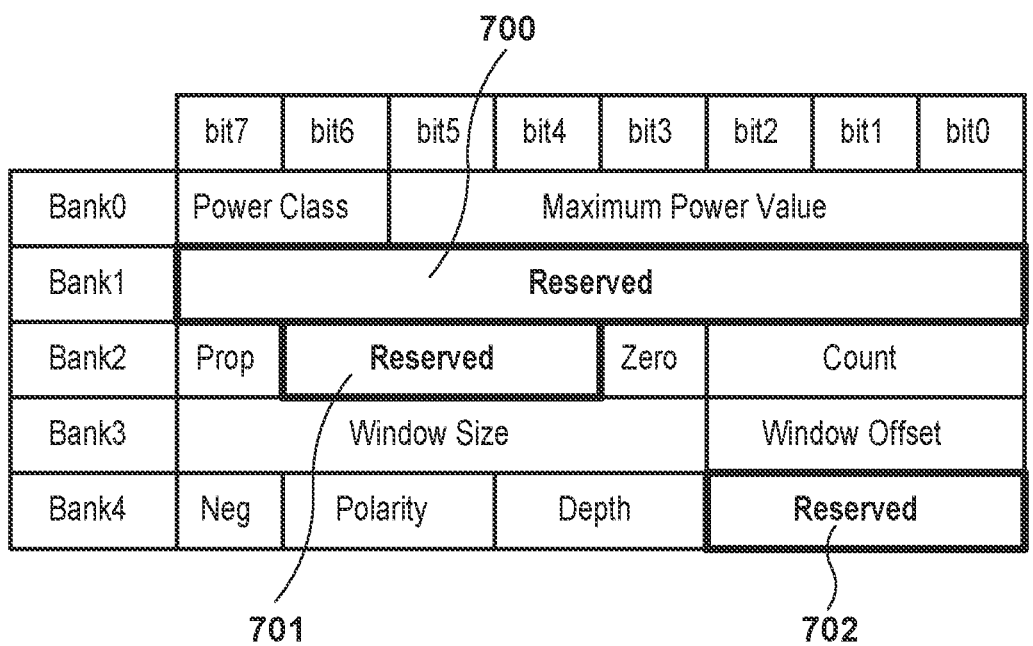
FIG. 7 is a view showing the structure of a Configuration Packet.

Additionally, in the I & C phase, the TX1 also receives a Configuration Packet transmitted by the RX1 (step S402). In this embodiment, a BLE bit representing whether the RX1 that is the transmission source of the packet is compliant with control communication by the BLE is transmitted using one bit in the Configuration Packet. The TX1 compliant with the version A of the WPC standard monitors this bit, thereby determining whether the RX1 has the control communication function using the BLE. Additionally, in this embodiment, a BLE Enable bit representing whether the RX1 can use BLE for control communication at that point of time is transmitted using another bit in the Configuration Packet. The Configuration Packet has a structure as shown in FIG. 7, and the BLE bit/BLE Enable bit can be set in one of Reserved fields (fields 700, 701, and 702). At this time, if the RX1 is compliant with control communication of the BLE, the field (bit) in which the BLE bit is set is set to "1". If BLE can be used for control communication, the field in which the BLE Enable bit is set is set to "1". Since "0" is normally stored in the Reserved field, a power receiving apparatus compliant with a version before the version A of the WPC standard stores "0" in this field. This can prevent the power transmission apparatus from misunderstanding that the power receiving apparatus that does not comply with the version A of the WPC standard is compliant with control communication by the BLE or can execute control communication. Note that this is merely an example, and the Configuration Packet need not always include these elements. For example, when the BD_ADDR is transmitted by the Extended Identification Packet in the above-described way, it can be known that the RX1 is compliant with communication by the BLE, and therefore, the BLE bit may be omitted. In this case, when, for example, the RX1 is not performing communication by the BLE with any other apparatus, the RX1 can transmit only the BLE Enable bit to allow the TX1 to grasp whether the RX1 can execute control communication by the BLE. Note that the BLE bit and the BLE Enable bit are merely examples, and these may not be used. For example, whether the RX1 is compliant with out-band communication that is not limited to the BLE and whether the RX1 is in a state in which it is possible to execute control communication by out-band communication when transmitting the Configuration Packet may be shown. Alternatively, the same field as the BLE bit or BLE Enable bit, which represents, for each of the communication methods usable for out-band communication other than BLE, whether the RX1 has the communication function or whether it can execute control communication may be provided. For example, an NFC bit representing whether the RX1 has an NFC communication function may be provided.

In response to the Configuration Packet, the TX1 transmits an acknowledgement (ACK) by in-band communication (step S403). According to the transmission of the ACK, the TX1 transitions to the negotiation phase.

In addition, the TX1 determines, by receiving the Configuration Packet, whether the RX1 has the control communication function by the BLE and is in a state in which it is possible to perform control communication by the BLE with the TX1 (step S404). In a case in which the RX1 does not have the control communication function by the BLE, or the RX1 is not in the state in which it is possible to perform control communication by the BLE (NO in step S404), the TX1 determines not to use out-band communication because the control communication by the BLE cannot be performed with the RX1 (step S420). In this case, the TX1 executes in-band communication in place of out-band communication. Then, the TX1 determines to set the maximum allowable value of a Guaranteed Power (GP) to 15 W (step S421). Note that the GP indicates a power value guaranteed by the power transmission apparatus concerning the power output from the power receiving unit 302 to the load (for example, the charge unit or the battery) even if the position relationship between the power transmission apparatus and the power receiving apparatus is shifted, and the power transmission efficiency between the power transmission coil 205 and the power receiving coil 305 lowers. The TX1 determines the magnitude of the allowable GP, and in a case in which a GP more than the allowable value is requested by the subsequent negotiation, operates to reject the request. After that, the TX1 advances the process to step S414.

Figure 8:
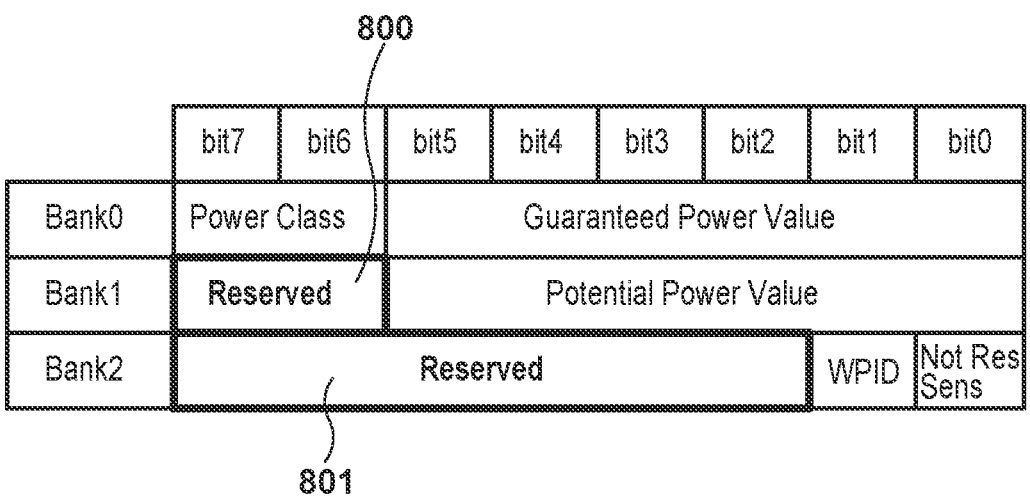
FIG. 8 is a view showing the structure of a Power Transmitter Capability Packet.

On the other hand, in a case in which the RX1 has the control communication function by the BLE and is in the state in which it is possible to perform control communication by the BLE (YES in step S404), the TX1 determines whether an inquiry about capability information is received from the RX1 (step S405). The inquiry about capability information is done by transmitting a General Request that is data defined by the WPC standard from the RX1 to the TX1. Note that the General Request configured to inquire about capability information will be referred to as a "General Req (Capability)" hereinafter. If the General Req (Capability) is not received (NO in step S405), the TX1 advances the process to step S420 to determine not to use out-band communication. On the other hand, if the General Req (Capability) is received (YES in step S405), the TX1 transmits a Power Transmitter Capability Packet defined by the WPC standard to the RX1. The Power Transmitter Capability Packet will be referred to as a "TX Capability Packet" hereinafter. As shown in FIG. 8, the TX Capability Packet includes information concerning the capability of the power transmission apparatus such as the maximum value of the GP. In this embodiment, one bit of the reserved fields (fields 800 and 801 in FIG. 8) of the TX Capability Packet is assigned as a BLE Enable bit. The BLE Enable bit has the same meaning as the BLE Enable bit in the Configuration Packet transmitted by the RX1. Note that the TX1 may use one bit of the reserved fields of the TX Capability Packet as a BLE bit. The BLE bit also has the same meaning as the BLE bit in the Configuration Packet transmitted by the RX1.

Before the information transmission by the TX Capability Packet, the TX1 determines whether the self-apparatus is in a state in which it is possible to use the BLE (step S406). If the self-apparatus is not in the state in which it is possible to use the BLE (NO in step S406), the TX1 sets the BLE Enable bit of the TX Capability Packet to "0" and transmits it to the RX1 (step S419), and advances the process to step S420. On the other hand, the TX1 determines, based on, for example, whether the self-apparatus is operating as a Peripheral of the BLE or using the BLE with another apparatus, whether control communication by the BLE can be executed at the current time. For example, if the self-apparatus is a Central, the TX1 can be connected to a plurality of Peripherals. Hence, the TX1 can determine that the BLE can be used for control communication. Additionally, if the self-apparatus is not performing communication by the BLE with another apparatus, the TX1 can determine that the BLE can be used for control communication. On the other hand, if the self-apparatus is serving as a Peripheral and performing communication by the BLE with another apparatus, the TX1 can determine that the BLE cannot be used for control communication. Additionally, the TX1 may perform this determination by communication with the control unit of a product (for example, a printer) connected to the TX1. For example, the control unit 201 of the TX1 and the control unit of the product may be connected by GPIO (General Purpose Input/Output) or serial communication, and the control unit 201 of the TX1 may inquire of the control unit of the product about the use state of the BLE. In this case, if the response concerning the use state of the BLE from the control unit of the product represents that the BLE is being used, the control unit 201 of the TX1 can determine that the BLE cannot be used for control communication at this point of time. In addition, if the response represents that the BLE is not being used, the control unit 201 of the TX1 can determine that the BLE can be used for control communication.

In a case in which the self-apparatus can use the BLE (YES in step S406), the TX1 sets the BLE Enable bit of the TX Capability Packet to "1" and transmits it to the RX1 (step S407). The TX1 determines that communication by the BLE can be performed with the RX1 at this point of time, and holds the BD_ADDR of the RX1 obtained in step S402 in the memory (step S408). Note that the TX1 may hold the BD_ADDR of the RX1 in the memory when it is obtained in step S402, and may discard the information upon determining that the self-apparatus cannot use the BLE (NO in step S406).

Note that after the TX Capability Packet with the BLE Enable bit set to "1" is transmitted in step S407, the TX1 may receive, from the RX1, a signal for inquiring about the identification information of the BLE of the TX1. This signal can be, for example, a General Request of the WPC standard. The General Request for inquiring about the identification information of the BLE will be referred to as a "General Req (ID)" hereinafter. Upon receiving the General Req (ID), the TX1 transmits a response including a BD_ADDR concerning the BLE of the self-apparatus to the RX1. This response can be a Power Transmitter Identification Packet (to be referred to as a "TX ID Packet" hereinafter) defined by the WPC standard. The TX ID Packet includes the version of the WPC standard with which the power transmission apparatus is compliant and an identification number by the manufacturer or the like of a functional block of the power transmission apparatus concerning in-band communication. In addition, the power transmission apparatus compliant with the version A can include the BD_ADDR of the BLE in the TX ID Packet. This allows the RX1 to recognize the identification information of the TX1 in the WPC standard and the identification information (BD_ADDR) in the BLE in association with each other.

Next to the process of step S408, to attempt control communication by the BLE with the RX1, the TX1 activates the BLE communication function of the self-apparatus as a scanner (step S409). Note that the scanner is one of the states defined by the BLE standard. The scanner receives a broadcast ADVERTISE_INDICATION and finds a BLE device (or service) as the transmission source. The ADVERTISE_INDICATION will be referred to as an ADV_IND hereinafter. The ADV_IND is a signal that is broadcast by a device in a state of advertiser defined by the BLE standard and advertises the BD_ADDR of the device or compliant service information.

After activated as the scanner, the TX1 waits for transmission of the ADV_IND (step S410). Upon receiving the ADV_IND of the BD_ADDR held in step S408 before the elapse of a predetermined time (during NO in step S418) (YES in steps S410 and S411), the TX1 transmits a connection request message by the BLE to the BD_ADDR (step S412). That is, when the ADV_IND from the RX1 is received before timeout, the TX1 transmits the connection request message by the BLE to the RX1. The connection request message is a CONNECT_REQ (to be sometimes referred to as a "CONNECT" hereinafter) defined by the BLE standard. Then, the TX1 transitions to the negotiation phase. Here, since communication by the BLE is possible, the negotiation in the negotiation phase is executed using the BLE. Since the state in which it is possible to execute control communication by the BLE (out-band communication) is obtained at this point of time, the TX1 determines that the GP can be set sufficiently high. For this reason, the TX1 sets the allowable maximum value of the GP to, for example, 100 W (step S413) and advances the process to step S414. Note that the TX1 may execute the processing of determining the maximum value of the allowable value of the GP after connection in out-band communication is actually established. In this case, if it is determined to use the out-band communication, but connection in the out-band communication cannot actually be established, the TX1 may advance the process to step S420.

Note that if an ADV_IND is received, but it is not the ADV_IND of the BD_ADDR held in step S408 (NO in step S411), the TX1 1 does not transmit the CONNECT. That is, at the stage of attempting control communication for power transmission, the TX1 1 limits the target of CONNECT transmission so the connection of the BLE is not established for an application purpose different from such control communication. Note that if timeout occurs before the ADV_IND from the RX1 is received (YES in step S418), the process advances to step S420.

In step S414, the TX1 performs a negotiation concerning the GP with the RX1. This negotiation is performed based on the maximum value of the GP allowable in the TX1 and the value of the GP requested by the RX1. Note that the maximum value of the GP allowable in the TX1 is determined by the process of step S413 or S421 depending on whether out-band communication is usable, as described above. After that, the TX1 executes processing in the calibration phase (step S415) and then transitions to the PT phase (step S416) to transmit the power to the RX1. In the PT phase, control data to request to increase/decrease the transmission power is transmitted from the RX1 to the TX1. This communication is control communication and is therefore performed by the BLE in a state in which it is possible to use the BLE (out-band communication). After that, upon receiving an End Power Transfer (EPT) to request stop of power transmission from the RX1 based on the end of charge or the like (step S417), the TX1 ends the power transmission processing. Note that the transmission/reception of the EPT is also control communication and is therefore performed by the BLE in a state in which it is possible to use the BLE (out-band communication).

As described above, the TX1 confirms whether the RX1 can execute control communication by the BLE. In addition, the TX1 recognizes the identification information of the RX1 in the WPC standard and the identification information in the BLE in association with each other, and transmits the CONNECT upon receiving an ADV_IND including the identification information of the RX1 in the BLE. This makes it possible to establish connection by the BLE with the target of power transmission and inhibit establishment of connection by the BLE with another apparatus that is not the target of power transmission.

[Operation of Power Receiving Apparatus]

An example of the procedure of processing executed by the power receiving apparatus (RX1) will be described next with reference to FIGS. 5A and 5B. Note that this processing can be executed when the power receiving function is activated by, for example, a user operation such as pressing of a predetermined button, or when the RX1 is brought to the neighborhood of the TX1. Note that this processing may be started when the control unit 301 and the first communication unit 303 are activated by a power received via the power receiving coil 305. In addition, this processing can be implemented when the control unit 301 executes a program stored in the memory 308. However, dedicated hardware configured to execute processing to be described later may be used. For example, when at least part of the processing is implemented by hardware, a dedicated circuit automatically generated on an FPGA using a predetermined compiler from a program configured to implement the processing steps can be used. Alternatively, hardware configured to execute a predetermined processing step may be implemented by a Gate Array circuit, like the FPGA.

Figure 5A:
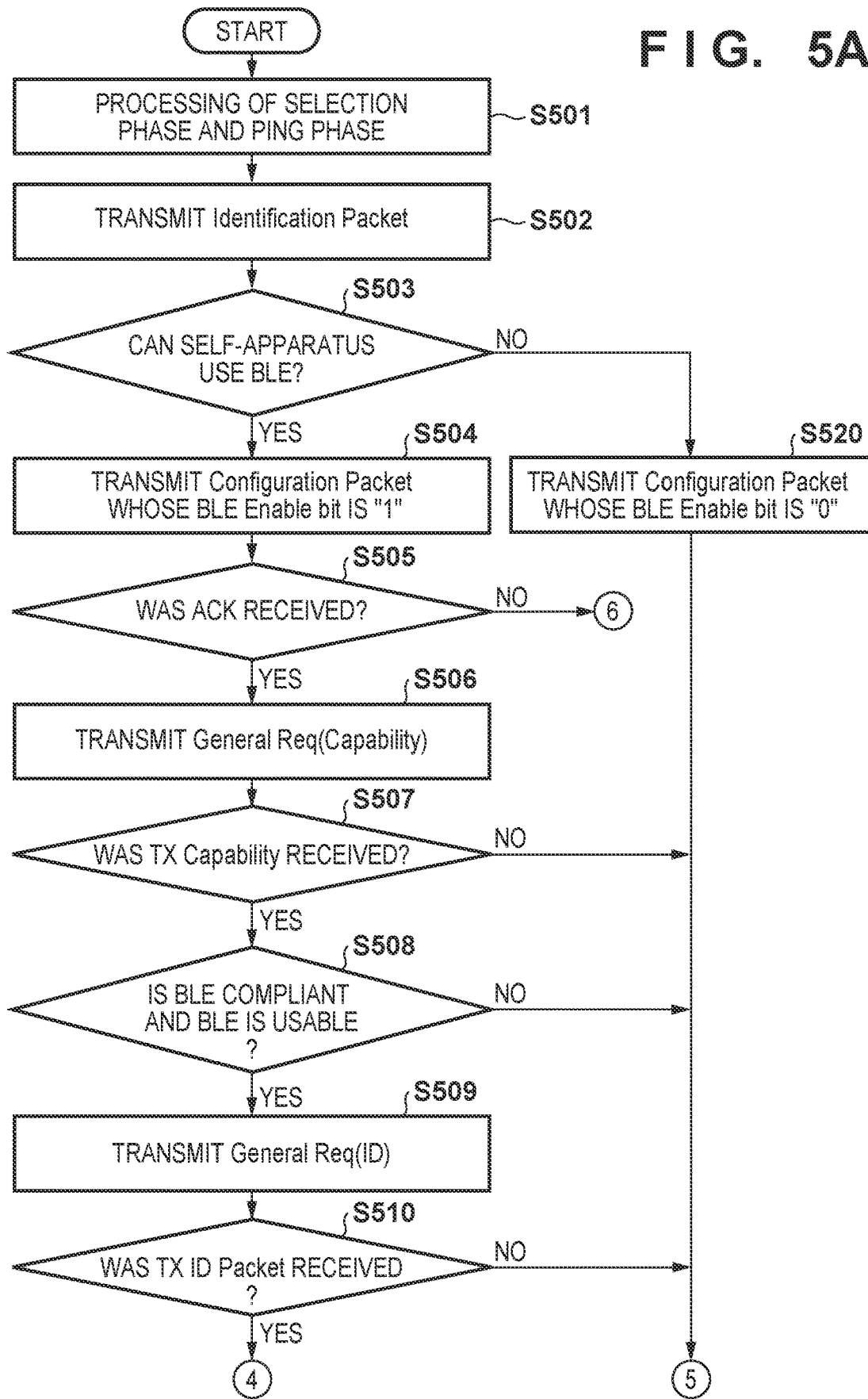
FIGS. 5A and 5B are a flowchart showing an example of the procedure of processing of the power receiving apparatus.
Figure 5B:
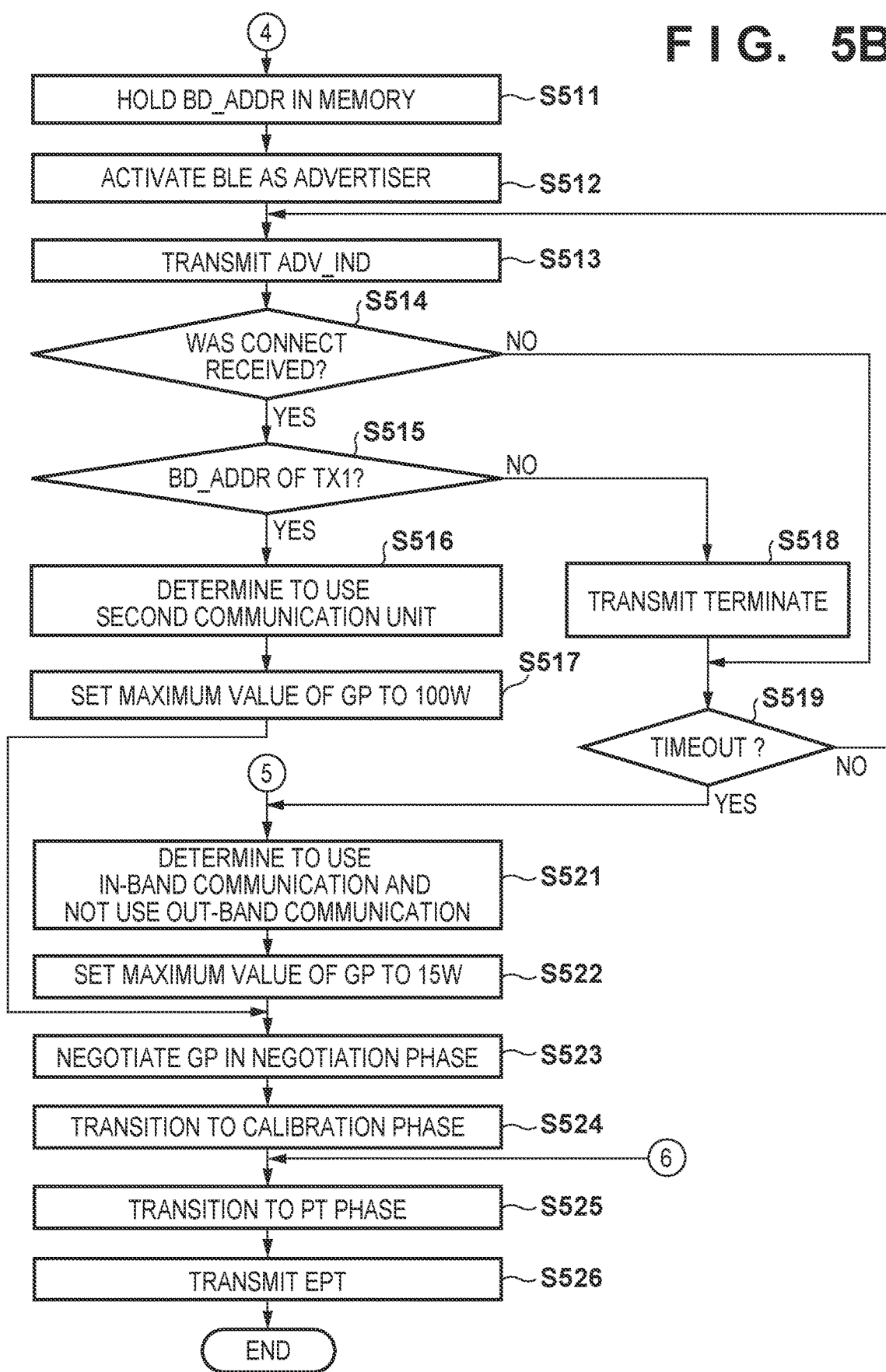

Referring to FIGS. 5A and 5B, the RX1 is first placed near the TX1 and thus detected by the TX1. Accordingly, the TX1 transmits a Digital Ping. The control unit 301 and the first communication unit 303 of the RX1 are activated by the Digital Ping received via the power receiving coil 305 and measure the magnitude of the received voltage of the Digital Ping. The RX1 then notifies the TX1 of the magnitude of the received voltage by in-band communication (step S501). After that, the RX1 transitions to the I & C phase.

In the I & C phase, the RX1 transmits an Identification Packet to the TX1 by in-band communication (step S502). At this time, the Identification Packet includes information representing whether the RX1 is compliant with the version A of the WPC standard and the individual identification information used at least in the WPC standard of a version before the version A. Note that the individual identification information used in the WPC standard is identification information used in a case in which control communication is performed by in-band communication. In addition, the RX1 can set, in the Identification Packet, an EXT bit representing that additional ID information exists and transmit it. If additional ID information exists, the RX1 sets the EXT bit of the Identification Packet to "1", and transmits an Extended Identification Packet to transmit the additional ID information. The Extended Identification Packet is also transmitted by in-band communication according to the WPC standard. In this embodiment, an 8-byte BD_ADDR used in the BLE is transmitted by the Extended Identification Packet.

After transmission of the Identification Packet, the RX1 transmits the Configuration Packet. At this time, first, the RX1 determines whether the self-apparatus is in a state in which it is possible to use the BLE for control communication (step S503). Whether the BLE can be used for control communication is determined based on, for example, whether the self-apparatus is operating as a Peripheral of the BLE or using the BLE with another apparatus. For example, if the self-apparatus is a Central, the RX1 can be connected to a plurality of Peripherals. Hence, the RX1 can determine that the BLE can be used for control communication. Additionally, if the self-apparatus is not performing communication by the BLE with another apparatus, the RX1 can determine that the BLE can be used for control communication. On the other hand, if the self-apparatus is serving as a Peripheral and performing communication by the BLE with another apparatus, the RX1 can determine that the BLE cannot be used for control communication. Additionally, the RX1 may perform this determination by communication with the control unit of a product (for example, a smartphone or a camera) connected to the RX1. For example, the control unit 301 of the RX1 and the control unit of the product may be connected by GPIO (General Purpose Input/Output) or serial communication, and the control unit 301 of the RX1 may inquire of the control unit of the product about the use state of the BLE. In this case, if the response concerning the use state of the BLE from the control unit of the product represents that the BLE is being used, the control unit 301 of the RX1 can determine that the BLE cannot be used for control communication at this point of time. In addition, if the response represents that the BLE is not being used, the control unit 301 of the RX1 can determine that the BLE can be used for control communication. Note that the information representing whether the RX1 is compliant with communication by the BLE and whether the BLE can be used for control communication can be transmitted using the Reserved field of the Configuration Packet, as described above.

In a case in which the self-apparatus cannot use the BLE for control communication at the current time (NO in step S503), the RX1 transmits the Configuration Packet with the BLE Enable bit set to "0" to the TX1 by in-band communication (step S520). Since it is impossible to perform control communication using the BLE with the TX1, the RX1 determines not to use out-band communication (step S521). In this case, the RX1 executes in-band communication in place of out-band communication. Then, the RX1 determines to set the maximum value of the GP to be requested to 15 W (step S522), and advances the process to step S523.

On the other hand, in a case in which the self-apparatus can use the BLE for control communication at the current time (YES in step S503), the RX1 transmits the Configuration Packet with the BLE Enable bit set to "1" to the TX1 by in-band communication (step S504). After that, the RX1 waits for an ACK from the TX1 (step S505). If the ACK is not received (NO in step S505), the RX1 transitions to the PT phase (step S525) to receive a power transmitted from the TX1. Then, the RX1 transmits an EPT to the TX1 in accordance with determining to end the power transmission based on the completion of charge of the battery 307 (step S526), and ends the processing. A power transmission apparatus that is compliant with only a version before the version 1.2 of the WPC standard is not compliant with the negotiation phase and the calibration phase. For this reason, upon receiving the Configuration Packet, the power transmission apparatus transitions to the PT phase without transmitting the ACK. Hence, the RX1 transitions to the PT phase in a case in which the ACK is not received from the TX1, thereby performing power reception even in a case in which the TX1 is a power transmission apparatus of a version before the version 1.2 of the WPC standard. That is, with this arrangement, the RX1 can ensure backward compatibility. Note that if the ACK is not received, the maximum value of the power that can be supplied by the power receiving unit 302 to the load (the charge unit 306 and the battery 307) is limited to 5 W.

Upon receiving the ACK (YES in step S505), the RX1 transmits a General Req (Capability) that inquires about the capability information of the TX1 (step S506) and waits for the response (TX Capability Packet) (step S507). If the TX Capability Packet is not received (NO in step S507), the RX1 determines not to use out-band communication (step S521), and executes processing from step S522 described above. Upon receiving the TX Capability Packet (YES in step S507), the RX1 confirms the BLE bit and the BLE Enable bit of the packet and determines whether the TX1 can execute control communication by the BLE (step S508). Upon determining that the TX1 cannot execute control communication by the BLE (NO in step S508), the process advances to step S521.

Upon determining that the TX1 can execute control communication by the BLE (YES in step S508), the RX1 transmits a General Req (ID) to obtain the identification information of the TX1 in the BLE (step S509). The RX1 waits for a TX ID Packet from the TX1 as a response to the General Req (ID) (step S510). If the TX ID Packet is not received from the TX1 (NO in step S510), the RX1 determines not to use out-band communication (step S521), and executes processing from step S522 described above. On the other hand, upon receiving the TX ID Packet from the TX1 compliant with the version A of the WPC standard (YES in step S510), the RX1 obtains the BD_ADDR of the TX1, which is stored in the packet, and holds it in the memory 308 (step S511). At this point of time, the RX1 can recognize the identification information of the TX1 in the WPC standard and the BD_ADDR in the BLE in association with each other. Then, to perform control communication by the BLE with the TX1, the RX1 activates the self-apparatus as an advertiser of the BLE (step S512) and broadcasts an ADV_IND (step S513). Note that the advertiser is one of the states defined by the BLE standard. The advertiser has a role of advertising the BD_ADDR of the self-apparatus or compliant service information by the ADV_IND such that the above-described scanner can find a BLE device (or service). Here, the ADV_IND includes a UUID (Universally Unique IDentifier) representing a service (provider) with which the second communication unit 304 is compliant. Note that in this embodiment, a UUID representing a wireless charge service (to be referred to as a "wireless charge service" hereinafter) using out-band communication according to the WPC standard is included in the ADV_IND. In addition, the ADV_IND can also include pieces of information such as the device type (for example, a camera or a smartphone), the maker name, the model name, and the serial number of the product to which the power receiving apparatus (RX1) is connected.

After that, the RX1 waits for a CONNECT transmitted from the scanner that has received the ADV_IND (step S514). Upon receiving the CONNECT (YES in step S514), the RX1 determines whether the identification information of the transmission source of the CONNECT is held in the memory 308 as the identification information (BD_ADDR) of the TX1 (step S515). That is, the RX1 determines whether the transmission source of the CONNECT is the TX1. Here, if the transmission source of the CONNECT is not the TX1 (NO in step S515), the RX1 transmits an LL_TERMINATE_IND representing disconnection of the BLE connection established by the CONNECT to the apparatus of the transmission source of the CONNECT (step S518). Note that the LL_TERMINATE_IND will be referred to as a "TERMINATE" hereinafter. If the CONNECT from the TX1 is not received (NO in step S514 or S515), the RX1 repetitively transmits the ADV_IND until a predetermined time elapses from the start of transmission of the ADV_IND, and timeout occurs (during NO in step S519) (step S513). If timeout occurs without receiving the CONNECT from the TX1 (YES in step S519), the RX1 determines not to use out-band communication (step S521), and executes processing from step S522 described above.

On the other hand, upon receiving the CONNECT from the TX1 (YES in steps S514 and S515), the RX1 determines to use out-band communication (step S516), and determines to set the maximum value of the GP to be requested to 100 W (step S517). Note that the RX1 may perform the determination processing of the requested value of the GP in accordance with the determining to use out-band communication, or may execute the processing after connection in out-band communication is actually established. In addition, if it is determined to use the out-band communication in step S516, but connection in the out-band communication cannot actually be established, the RX1 may advance the process to step S521. After that, the RX1 advances the process to step S523. In step S523, the RX1 performs a negotiation concerning the GP with the TX1. This negotiation is performed based on the maximum value of the GP allowable in the TX1 and the value of the GP requested by the RX1. Note that the maximum value of the GP requested by the RX1 is determined by the process of step S517 or S522 depending on whether out-band communication is usable, as described above. After that, the RX1 executes processing in the calibration phase (step S524) and then transitions to the PT phase (step S525) to receive a power from the TX1. In the PT phase, control data to request to increase/decrease the transmission power is transmitted from the RX1 to the TX1. This communication is control communication and is therefore performed by the BLE in a state in which it is possible to use the BLE (out-band communication). After that, in accordance with, for example, the end of charge, the RX1 transmits an EPT representing a request of stop of power transmission for battery charge to the TX1 by the BLE (out-band communication) (step S526). Then, the RX1 transmits the TERMINATE to disconnect the connection of the BLE as needed and ends the processing. Note that the transmission of the TERMINATE after the transmission of the EPT may be done by the TX1.

As described above, the RX1 confirms whether the TX1 can execute control communication by the BLE. In addition, the RX1 recognizes the identification information of the TX1 in the WPC standard and the identification information in the BLE in association with each other, and upon receiving the CONNECT that does not include the identification information of the TX1 in the BLE, disconnects the connection and receives only the CONNECT from the TX1. This makes it possible to establish connection by the BLE with the target of power transmission and inhibit establishment of connection by the BLE with another apparatus that is not the target of power transmission.

[Procedure of Processing of Power Transmission System]

Figure 6:
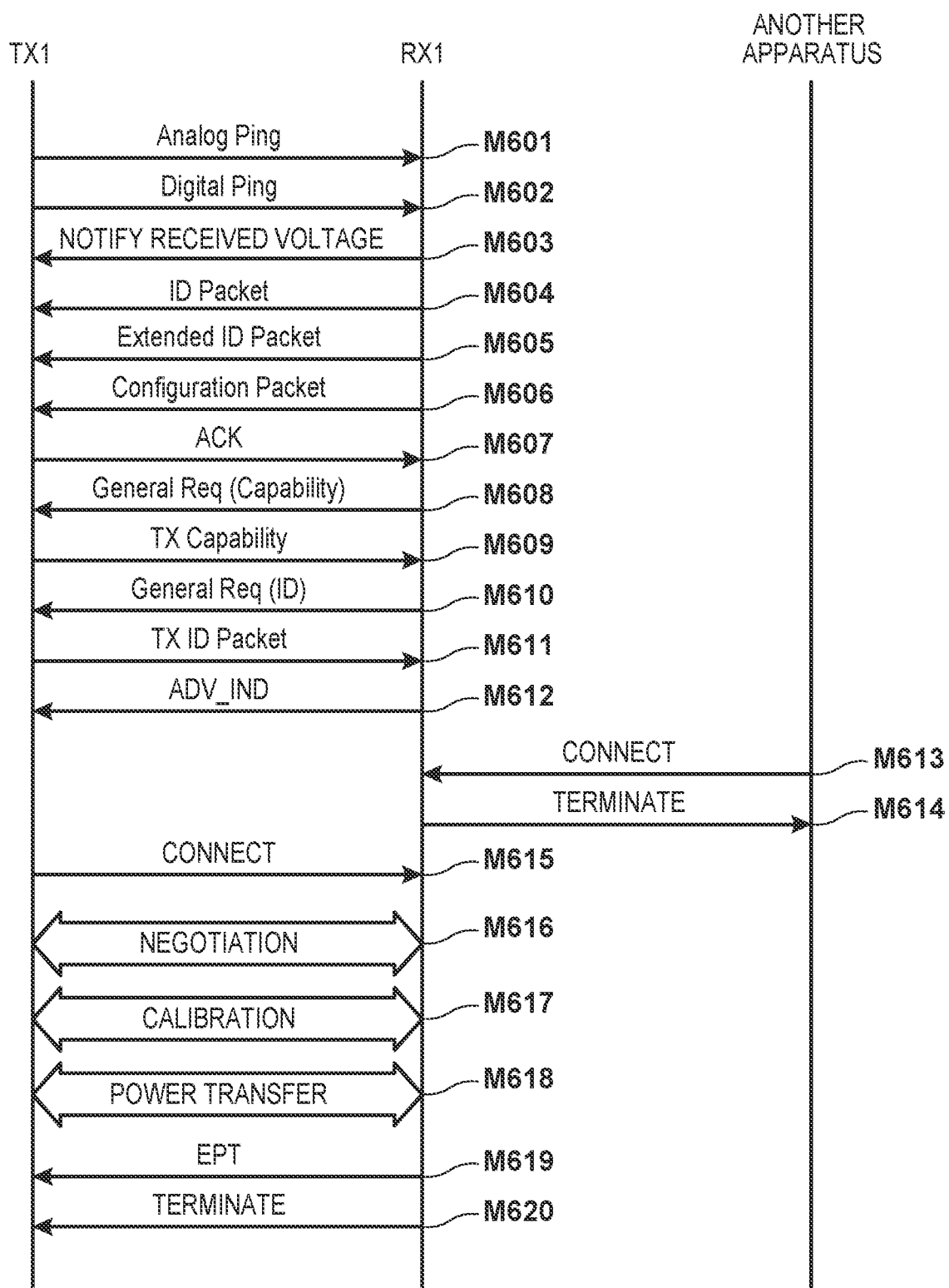
FIG. 6 is an operation sequence chart of the wireless power transmission system.

An example of the procedure of processing executed by the power transmission system will be described next with reference to FIG. 6. First, when the power transmission unit 203 of the TX1 receives power supply from the power supply unit 202 and is thus activated, the TX1 starts an operation complying with the WPC standard. That is, first, in the selection phase, the TX1 transmits the Analog Ping via the power transmission coil 205 (step M601). The TX1 detects the existence of the RX1 near the self-apparatus (within the power transmission/reception range), as shown in FIG. 3, by the Analog Ping, and transitions to the ping phase. In the ping phase, the TX1 transmits the Digital Ping (step M602). When the control unit 301 and the first communication unit 303 of the RX1 are activated by the Digital Ping received via the power receiving coil 305, the RX1 notifies the TX1 of the magnitude of the received voltage by in-band communication by the first communication unit 303 (step M603), and transitions to the I & C phase. Upon receiving the notification of the received voltage value, the TX1 ends the processing in the ping phase and transitions to the I & C phase.

Next, the RX1 transmits the Identification Packet to the TX1 using the first communication unit 303 (step M604). Here, by the Identification Packet, the RX1 notifies the TX1 of information representing that the RX1 is compliant with the version A of the WPC standard and the individual identification information of the RX1 used at least in the WPC standard of a version before the version A. Additionally, in this processing example, to transmit the identification information used in the BLE later, the RX1 sets the EXT bit to "1" and transmits the Identification Packet. Then, the RX1 includes the 8-byte BD_ADDR used in the BLE in the Extended ID Packet and transmits it by in-band communication (step M605). In this processing example, the RX1 transmits the Configuration Packet in which the BLE bit representing that the self-apparatus is compliant with control communication by the BLE is set to "1" (step M606). Additionally, in the Configuration Packet, the BLE Enable bit is set to "1".

The TX1 transmits an acknowledgement (ACK) by in-band communication to the Configuration Packet from the RX1 (step M607). After the transmission of the ACK, the TX1 transitions to the negotiation phase. In addition, upon receiving the ACK, the RX1 ends the I & C phase and transitions to the negotiation phase. Note that at this point of time, the TX1 can recognize the identification information of the RX1 in the WPC standard and the BD_ADDR in the BLE in association with each other. The TX1 can also recognize that the RX1 is compliant with control communication by the BLE.

After that, to obtain information about the capability of the TX1, the RX1 transmits the General Req (Capability) by in-band communication (step M608). Upon receiving the General Req (Capability), the TX1 transmits the TX Capability Packet to the RX1 (step M609). Here, the TX1 transmits the TX Capability Packet whose BLE bit/BLE Enable bit is set to "1" so as to include information representing that the self-apparatus is compliant with the version A of the WPC standard and can execute control communication by the BLE. At this time, upon receiving the TX Capability Packet, the RX1 can recognize that the TX1 is compliant with control communication by the BLE and can use the BLE for control communication. Next, the RX1 transmits the General Req (ID) by in-band communication to request transmission of the identification information of the TX1 (step M610). Upon receiving the General Req (ID), the TX1 transmits the TX ID Packet to the RX1 by in-band communication (step M611). At this point of time, the RX1 can recognize the identification information of the TX1 in the WPC standard and the BD_ADDR in the BLE in association with each other. The RX1 can also recognize that the TX1 is compliant with control communication by the BLE.

After that, to attempt control communication by the BLE with the TX1, the RX1 activates the BLE of its own as the advertiser and transmits the ADV_IND (step M612). Note that at this time, the TX1 holds, in the memory, the BD_ADDR of the RX1 obtained in step M605, and activates the self-apparatus as the scanner of the BLE to perform control communication by the BLE with the RX1.

Here, assume that not only the TX1 but also another apparatus (for example, the first communication apparatus 121) operates as a scanner. At this time, the other apparatus is assumed to receive the ADV_IND transmitted from the RX1 in step M612 and transmit a CONNECT to the RX1 to request connection by the BLE (step M613). Upon receiving the CONNECT, the RX1 refers to the memory 308 and determines whether the identification information of the transmission source of the CONNECT matches the identification information (BD_ADDR) of the TX1. In this case, since the other apparatus is different for the TX1, the RX1 determines not to be connected with the other apparatus, and transmits the TERMINATE to the other apparatus (step M614).

On the other hand, upon receiving the ADV_IND, the TX1 confirms whether a UUID representing a wireless charge service is included in the ADV_IND. Here, as described above, the ADV_IND includes the UUID representing the wireless charge service. Next, the TX1 refers to the memory 207 and determines whether the transmission source of the ADV_IND matches the identification information (BD_ADDR) of the RX1 held in the memory 207. Since the ADV_IND in step M612 is transmitted from the RX1, the TX1 determines to be connected to the RX1 that is the transmission source of the ADV_IND, and transmits a CONNECT to the RX1 (step M615). Since the transmission source of the CONNECT is the TX1, in this case, the RX1 does not transmit the TERMINATE and maintains the connection.

Note that in some cases, the TX2 receives the ADV_IND transmitted by the RX1. In this case, however, the TX2 holds the BD_ADDR of the RX2 existing within the power transmission/reception range in the memory 207 but not the BD_ADDR of the RX1. For this reason, the TX2 does not transmit the CONNECT to the RX1.

After that, the TX1 and the RX1 perform the negotiation concerning the GP using the BLE (out-band communication) (step M616). At this point of time, the TX1 can use the BLE (out-band communication) for control communication with the RX1 existing within the power transmission/reception range and therefore sets the allowable maximum value of the GP to 100 W. The RX1 also sets the maximum value of the GP to be requested to 100 W. Then, the TX1 and the RX1 perform the negotiation to determine the GP using the allowable value of the GP and the requested value of the GP. After that, after processing in the calibration phase is executed (step M617), in the PT phase, power transmission to change the battery is performed between the TX1 and the RX1 (step M618). In the PT phase, control data to request to increase/decrease the transmission power is transmitted from the RX1 to the TX1. In this example, this is done by the BLE (out-band communication).

When the charge ends, the RX1 transmits the EPT representing a request to stop power transmission for battery charge to the TX1 by the BLE (out-band communication) (step M619). Upon receiving the EPT, the TX1 ends the power transmission for charge. When the power transmission for charge ends, the RX1 transmits the TERMINATE to the TX1 and disconnects the BLE (step M620).

As described above, in this embodiment, each of the power transmission apparatus and the power receiving apparatus specifies, using in-band communication, whether the partner apparatus is compliant with out-band communication. Each of the power transmission apparatus and the power receiving apparatus obtains, using in-band communication, identification information used by the partner apparatus in out-band communication. In addition, upon receiving the ADV_IND by the out-band communication, the power transmission apparatus determines, based on the identification information obtained by the in-band communication, whether to transmit the CONNECT. Also, upon receiving the CONNECT that is the response to the ADV_IND, the power receiving apparatus determines, based on the identification information obtained by the in-band communication, whether to transmit the TERMINATE.

This allows the power transmission apparatus and the power receiving apparatus to perform control communication by the BLE with the power receiving apparatus and the power transmission apparatus, which are located within the power transmission/reception range, before the transmission/reception of a power to charge the battery or the negotiation of the power. When the control communication is performed by out-band communication in this way, a large power can be transmitted/received as compared to a case of in-band communication.

If the partner apparatus is compliant with the BLE but cannot use the BLE (when the BLE Enable bit is "0"), each of the power transmission apparatus and the power receiving apparatus determines to use not out-band communication but in-band communication. This allows the power transmission apparatus and the power receiving apparatus to perform power transmission/reception using in-band communication in a case in which the BLE is already used by the control unit of a product to which the partner apparatus is connected.

Note that in the above-described embodiment, when out-band communication cannot be executed, the maximum GP allowable in the power transmission apparatus and the maximum value of the GP requested by the power receiving apparatus are set to 15 W. In addition, if the TX1 is a power transmission apparatus of a version before the version 1.2 of the WPC standard, the power supplied to the load of the power receiving apparatus is limited to 5 W. On the other hand, depending on the product connected to the power receiving apparatus, the product is assumed to be unable to operate because of a power shortage in a case of 5 W or 15 W. For example, the load may be a product that does not operate by the power of the battery and directly receives power supply from the power receiving unit 302. In this case, when the power of 5 W or 15 W is supplied, the product may cause an operation error. To avoid such a state, upon determining that out-band communication cannot be used for control communication, the power receiving apparatus may transmit the EPT to the power transmission apparatus. This can prevent an insufficient power from being supplied by wireless power transmission and prevent a problem such as an operation error from occurring in the product.

On the other hand, also considerable is a case in which the control unit of the product connected to the RX1 controls the BLE (second communication unit 304) of the RX1, and the second communication unit 304 operates by the power of the battery 307. In a case in which the battery remaining amount is not sufficient in such a system (for example, in a case in which the battery remaining amount is 0) as well, out-band communication cannot be executed. However, in a case in which the product operates by the power of the battery, if the battery remaining amount is not sufficient, the product does not operate, and therefore, the above-described problem such as an operation error does not occur. For this reason, the RX1 may receive a power of 15 W using in-band communication instead of transmitting the EPT.

Additionally, in the above-described embodiment, the RX1 transmits the General Req (ID), thereby requesting transmission of the BD_ADDR of the TX1. However, the present disclosure is not limited to this. For example, of the Specific Requests of the version 1.2.2 of the WPC standard, a Reserved Packet or Proprietary Packet whose Packet type is undefined may be used for the request. Alternatively, of the General Requests of the version 1.2.2 of the WPC standard, a Reserved Packet or Proprietary Packet whose Packet type is undefined may be used for the request. Also, of the packets of the version 1.2.2 of the WPC standard, a packet other than the Specific Requests and the General Requests may be used for the request. For example, a Reserved Packet or Proprietary Packet other than the Specific Requests and the General Requests, whose Packet type is undefined, can be used for the request.

Additionally, in the above description, the RX1 notifies the TX1, using the Configuration Packet, that the self-apparatus is compliant with control communication by the BLE. However, the present disclosure is not limited to this. For example, of the Specific Requests of the version 1.2.2 of the WPC standard, a Reserved Packet or Proprietary Packet whose Packet type is undefined may be used to make this notification. Alternatively, of the General Requests of the version 1.2.2 of the WPC standard, a Reserved Packet or Proprietary Packet whose Packet type is undefined may be used for this notification. Also, of the packets of the version 1.2.2 of the WPC standard, a packet other than the Specific Requests and the General Requests may be used for this notification. For example, a Reserved Packet or Proprietary Packet other than the Specific Requests and the General Requests, whose Packet type is undefined, may be used.

Additionally, in the above description, the BD_ADDR is a Public Address defined by the BLE standard and representing the manufacturer of the power transmission apparatus or the power receiving apparatus or the individual identification information of the communication circuit (second communication unit) of the BLE. However, the present disclosure is not limited to this. For example, a random number automatically generated by the second communication unit, such as a Random Address defined by the BLE standard, may be used. Of the Random Addresses, one of a Static Device Address, a Resolvable Private Address, and a Non-resolvable Private Address may be used. Here, the Static Device Address is a random number address generated every time the second communication unit (BLE communication circuit) is powered on. The Non-resolvable Private Address is a random number address generated at a predetermined time interval. The Resolvable Private Address is an address generated based on an encryption key exchanged between a Central and a Peripheral.

Additionally, in the above description, the RX1 transmits the ADV_IND in step M612, and transmits the TERMINATE in response to the CONNECT from a BLE compliant device (for example, the first communication apparatus 121 or the TX2) other than the TX1 that has transmitted the BD_ADDR by in-band communication. Instead, in step M612, an ADV_DIRECT_IND defined by the BLE standard and capable of directly designating the BD_ADDR of a BLE compliant device that should transmit the CONNECT may be transmitted. For example, the RX1 transmits the ADV_DIRECT_IND storing the BD_ADDR of the TX1 in step M612. In this case, only the TX1 with the designated BD_ADDR transmits the CONNECT, and the first communication apparatus 121 does not transmit the CONNECT. This can simplify the connection processing of the BLE.

Additionally, in this embodiment, an example in which the power receiving apparatus is a Peripheral, and the power transmission apparatus is a Central, as shown in FIG. 1, has been described. However, the power receiving apparatus may be a Central, and the power transmission apparatus may be a Peripheral. That is, in the processing concerning the BLE in the above description, the RX1 and the TX1 may be exchanged. For example, to attempt control communication by the BLE with the RX1, the TX1 activates the BLE of the self-apparatus as the advertiser, and transmits the ADV_IND in step M612. To attempt control communication by the BLE with the TX1, the RX1 can activate the BLE of the self-apparatus as the scanner and receive the ADV_IND from the TX1. If the identification information of the transmission source of the ADV_IND corresponds to the BD_ADDR of the TX1 obtained by receiving the TX ID Packet in step M611, the RX1 can transmit the CONNECT to the TX1 in step M615. Based on the BD_ADDR of the RX1 obtained by receiving the Extended ID Packet obtained in step M605, the TX1 establishes and maintains connection by the BLE in accordance with the CONNECT from the RX1. On the other hand, if the CONNECT from an apparatus other than the RX1 is received, the TX1 transmits the TERMINATE to disconnect the established BLE connection, thereby rejecting the BLE connection. Note that in this case as well, in step M612, the TX1 may transmit the ADV_DIRECT_IND storing the BD_ADDR of the RX1 received in advance.

Additionally, in the above description, the TX1 or the RX1 determines, using the BLE bit or the BLE Enable bit, whether the partner apparatus is compliant with the BLE or can use the BLE. However, at least one of the determinations may be done by a response to a packet that requests transition from in-band communication to out-band communication and is transmitted by the RX1. In the negotiation phase, the RX1 can use, for this request, a Reserved Packet or Proprietary Packet whose Packet type is undefined in the Specific Requests of the version 1.2.2 of the WPC standard. Alternatively, of the General Requests of the version 1.2.2 of the WPC standard, a Reserved Packet or Proprietary Packet whose Packet type is undefined may be used for the request. Also, of the packets of the version 1.2.2 of the WPC standard, a packet other than the Specific Requests and the General Requests may be used for the request. For example, a packet that requests out-band communication may newly be defined using these packets, and upon receiving the ACK from the TX1 as the response to the packet, the RX1 may determine that the TX1 is compliant with the BLE and can use the BLE (YES in step S508). In addition, upon receiving a NAK that means rejection of the request, the RX1 may determine that the TX1 is not compliant with the BLE or cannot use the BLE, and may determine to use in-band communication (step S521). In a case in which the TX1 is not compliant with the version A, the TX1 transmits a No Data Response (ND Resp) packet representing that the request cannot be understood or a Not Data Available packet. Hence, upon receiving the ND Resp packet or the Not Data Available packet, the RX1 can determine to use in-band communication because the TX1 is not compliant with out-band communication (step S521).

Additionally, in the above-described embodiment, the RX1 transmits the BD_ADDR using the Extended ID Packet. When the Extended ID Packet already defined by the WPC standard is used to transmit the BD_ADDR, the already defined packet can be used without newly defining a packet in the version A.

In addition, after the transmission of the ACK in step M607, a TX1 and an RX1 of the version 1.2.2 transition to the negotiation phase and perform the negotiation of the GP. To the contrary, the TX1 and the RX1 according to this embodiment perform the BLE connection processing (steps M612 and M615) and then perform a negotiation to determine whether to set the GP to 15 W or 100 W in accordance with the result of the connection processing. At this time, when the maximum value of the GP allowable in the TX1 and that of the GP requested by the RX1 are determined, before the negotiation, based on the result of BLE connection, the necessity of a renegotiation that is performed in a case of inappropriate GP setting is obviated. As a result, waste of time caused by such a renegotiation can be reduced. For example, in a case in which BLE connection cannot be established after it is determined to transmit a power of 100 W as the result of negotiation, it is necessary to set the maximum value of the GP to 15 W and perform a renegotiation. However, such a situation can be avoided.

In the above description, an example in which wireless power transmission complying with the WPC standard is used has been described. However, the power transmission method is not particularly limited. For example, a magnetic field resonance method of transmitting a power using coupling caused by the resonance of a magnetic field between the resonator (resonance element) of the TX and the resonator (resonance element) of the RX may be used. Alternatively, a power transmission method using an electromagnetic induction method, an electric field resonance method, a microwave method, a laser, or the like may be used.

Note that the above description has been made using specific technical terms based on the WPC standard and the BLE standard. However, the present disclosure is not limited to this. That is, the present disclosure should be interpreted to incorporate a case in which in a system having the same arrangement as described above, messages of the same effects are transmitted/received, and the same processes are executed. Additionally, in the above-described description, a field used to transmit specific information is provided in a specified message in the WPC standard or the BLE standard. However, the present disclosure is not limited to this. That is, to transmit information of the same effect, a message different from that described above may be used. For example, in the above description, the information representing whether the RX1 is compliant with the BLE or whether the RX1 can execute control communication by the BLE is stored in a specific field in the Configuration Packet. However, a new message to transmit these pieces of information may be defined. This also applies to the remaining messages.

In addition, the power transmission apparatus and the power receiving apparatus may each be included in, for example, an image input apparatus such as an image capturing apparatus (a camera or a video camera) or a scanner, or an image output apparatus such as a printer, a copying machine, or a projector. Also, the power transmission apparatus and the power receiving apparatus may each be included in a storage device such as a hard disk drive or a memory device, or an information processing apparatus such as a personal computer (PC) or a smartphone.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power receiving apparatus comprising:
a power receiving unit configured to wirelessly receive a power from a power transmission apparatus;
a first communication unit configured to perform communication using a first method; and
a second communication unit configured to perform communication using a second method different from the first method,
wherein the first communication unit receives a first signal including information for specifying whether the power transmission apparatus supports a communication function using the second method,
the first communication unit transmits, to the power transmission apparatus, a second signal to request identification information of the power transmission apparatus for the communication using the second method, based on that the information included in the received first signal represents that the power transmission apparatus supports the communication function using the second method, and
in a case where the first communication unit receives a third signal including information for specifying the identification information of the power transmission apparatus for the communication using the second method, the second communication unit performs the communication using the second method with the power transmission apparatus based on the identification information of the power transmission apparatus for the communication using the second method specified based on the information included in the third signal received by the first communication unit.

2. The apparatus according to claim 1, wherein the first signal includes a field configured to represent whether the power transmission apparatus has a function of performing the communication using the second method.

3. The apparatus according to claim 1, wherein the first signal includes a field configured to represent whether the power transmission apparatus is in a state in which it is possible to perform the communication using the second method at a point of time of transmitting the first signal.

4. The apparatus according to claim 1, wherein the first signal is a Power Transmitter Capability Packet of a WPC (Wireless Power Consortium) standard.

5. The apparatus according to claim 1, wherein the first signal is a signal for specifying capability of the power transmission apparatus.

6. The apparatus according to claim 1, wherein the first communication unit performs the communication using the first method with the power transmission apparatus for control communication of wireless power transmission, based on that the information included in the received first signal represents that the power transmission apparatus does not support the communication function using the second method.

7. The apparatus according to claim 1, wherein the second communication unit performs the communication using the second method with the power transmission apparatus for control communication of wireless power transmission, based on that a request of connection is received by the second communication unit, from the power transmission apparatus whose identification information for the communication using the second method is specified based on the information included in the third signal received via the first communication unit.

8. The apparatus according to claim 1, wherein the second communication unit does not performs the communication using the second method with the power transmission apparatus for control communication of wireless power transmission, based on that a request of connection is received via the second communication unit, from a transmission source that does not correspond to the power transmission apparatus whose identification information for the communication using the second method is specified based on the information included in the third signal received via the second communication unit.

9. The apparatus according to claim 1, wherein the first communication unit performs the communication using the first method with the power transmission apparatus for control communication of wireless power transmission, based on an elapse of a predetermined time without receiving, via the second communication unit, a request of connection from the power transmission apparatus whose identification information for the communication using the second method is specified based on the information included in the third signal received via the first communication unit.

10. The apparatus according to claim 1, wherein the second signal is a General Request of a WPC standard.

11. The apparatus according to claim 1, wherein the second signal is a signal for requesting the power transmission apparatus to respond with the second signal.

12. The apparatus according to claim 1, wherein the first communication unit transmits, to the power transmission apparatus, a fourth signal including information for specifying that the power receiving apparatus supports a communication function using the second method.

13. The apparatus according to claim 12, wherein the fourth signal includes a field configured to represent that the power receiving apparatus has a function of performing the communication using the second method.

14. The apparatus according to claim 12, wherein the fourth signal includes a field configured to represent that the power receiving apparatus is in a state in which it is possible to perform the communication using the second method at a point of time of transmitting the fourth signal.

15. The apparatus according to claim 12, wherein the fourth signal is a Configuration Packet of a WPC standard.

16. The apparatus according to claim 12, wherein the fourth signal is a signal for specifying a configuration of the power receiving apparatus.

17. The apparatus according to claim 12, wherein the first communication unit performs the communication using the first method with the power transmission apparatus for control communication of wireless power transmission, based on that a response to the fourth signal is not received from the power transmission apparatus.

18. The apparatus according to claim 1, wherein the first communication unit transmits, to the power transmission apparatus, a fourth signal including information for specifying identification information of the power receiving apparatus for the communication using the second method.

19. The apparatus according to claim 18, wherein the fourth signal is an Extended Identification Packet of a WPC standard.

20. The apparatus according to claim 1, wherein the communication using the first method is communication complying with a WPC standard, and the communication using the second method is communication of Bluetooth Low Energy.

21. A power receiving apparatus comprising:
a power receiving unit configured to wirelessly receive a power from a power transmission apparatus;
a first communication unit configured to perform communication using a first method; and
a second communication unit configured to perform communication using a second method different from the first method,
wherein the first communication unit transmits a first signal including information for specifying that the power receiving apparatus supports a communication function using the second method,
the first communication unit transmits, to the power transmission apparatus, a second signal to request identification information of the power transmission apparatus for the communication using the second method, after transmitting the first signal, and
in a case where the first communication unit receives a third signal including information for specifying the identification information of the power transmission apparatus for the communication using the second method, the second communication unit performs the communication using the second method with the power transmission apparatus based on the identification information of the power transmission apparatus for the communication using the second method specified based on the information included in the third signal received by the first communication unit.

22. The apparatus according to claim 21, wherein the first signal includes a field configured to represent that the power receiving apparatus has a function of performing the communication using the second method.

23. The apparatus according to claim 21, wherein the first signal is a signal for specifying a configuration of the power receiving apparatus.

24. The apparatus according to claim 21, wherein the first communication unit transmits, to the power transmission apparatus, a fourth signal including information for specifying identification information of the power receiving apparatus for the communication using the second method.

25. The apparatus according to claim 24, wherein the fourth signal is an Extended Identification Packet of a WPC standard.

26. The apparatus according to claim 21, wherein the second communication unit performs the communication using the second method with the power transmission apparatus for control communication of wireless power transmission, based on that a request of connection is received by the second communication unit, from the power transmission apparatus whose identification information for the communication using the second method is specified based on the information included in the third signal received via the first communication unit.

27. The apparatus according to claim 21, wherein the second communication unit does not performs the communication using the second method with the power transmission apparatus for control communication of wireless power transmission, based on that a request of connection is received via the second communication unit, from a transmission source that does not correspond to the power transmission apparatus whose identification information for the communication using the second method is specified based on the information included in the third signal received via the second communication unit.

28. The apparatus according to claim 21, wherein the first communication unit performs the communication using the first method with the power transmission apparatus for control communication of wireless power transmission, based on an elapse of a predetermined time without receiving, via the second communication unit, a request of connection from the power transmission apparatus whose identification information for the communication using the second method is specified based on the information included in the third signal received via the first communication unit.

29. The apparatus according to claim 21, wherein the second signal is a signal for requesting the power transmission apparatus to respond with the second signal.

30. A power transmission apparatus comprising:
a power transmission unit configured to wirelessly transmit a power to a power receiving apparatus;
a first communication unit configured to perform communication using a first method; and
a second communication unit configured to perform communication using a second method different from the first method,
wherein the first communication unit transmits a first signal including information specifying that the power transmission apparatus supports a communication function using the communication of the second method, and
based on that the first communication unit receives a second signal to request identification information of the power transmission apparatus for the communication using the second method after transmitting the first signal, the first communication unit transmits a third signal including information for specifying the identification information of the power transmission apparatus for the communication using the second method.

31. The apparatus according to claim 30, wherein the first signal includes a field configured to represent that the power transmission apparatus has a function of performing the communication using the second method.

32. The apparatus according to claim 30, wherein the first signal includes a field configured to represent whether the power transmission apparatus is in a state in which it is possible to perform the communication using the second method at a point of time of transmitting the first signal.

33. The apparatus according to claim 30, wherein the first communication unit receives, from the power receiving apparatus, a fourth signal including information for specifying identification information of the power receiving apparatus for the communication using the second method.

34. The apparatus according to claim 33, wherein the second communication unit transmits a request of connection to the power receiving apparatus, after the fourth signal is received via the second communication unit.

35. The apparatus according to claim 30, wherein the first communication unit receives, from the power receiving apparatus, a fourth signal including information for specifying whether the power transmission apparatus supports communication using the second method.

36. A method of controlling a power receiving apparatus that is capable of performing communication using a first method and of performing communication using a second method different from the first method, and wirelessly receives a power from a power transmission apparatus, the method comprising:
 receiving, by using the first method, a first signal including information for specifying whether the power transmission apparatus supports a communication function using the second method;
 transmitting, by using the first method, to the power transmission apparatus, a second signal to request identification information of the power transmission apparatus for the communication using the second method, based on that the information included in the received first signal represents that the power transmission apparatus supports the communication function using the second method; and
 in a case where a third signal including information for specifying the identification information of the power transmission apparatus for the communication using the second method is received by using the first method, performing the communication using the second method with the power transmission apparatus based on the identification information of the power transmission apparatus for the communication using the second method specified based on the information included in the received third signal.

37. A method of controlling a power receiving apparatus that is capable of performing communication using a first method and of performing communication using a second method different from the first method, and wirelessly receives a power from a power transmission apparatus, the method comprising:
 transmitting, by using the first method, a first signal including information for specifying that the power receiving apparatus supports a communication function using the second method,
 transmitting, by using the first method, to the power transmission apparatus, a second signal to request identification information of the power transmission apparatus for the communication using the second method, after transmitting the first signal, and
 in a case where a third signal including information for specifying the identification information of the power transmission apparatus for the communication using the second method is received by using the first method, performing the communication using the second method with the power transmission apparatus based on the identification information of the power transmission apparatus for the communication using the second method specified based on the information included in the received third signal.

38. A method of controlling a power transmission apparatus that is capable of performing communication using a first method and of performing communication using a second method different from the first method, and wirelessly transmits a power to a power receiving apparatus, the method comprising:
 transmitting, by using the first method, a first signal including information specifying that the power transmission apparatus supports a communication function using the communication of the second method; and
 based on that a second signal to request identification information of the power transmission apparatus for the communication using the second method is received by using the first method after transmitting the first signal, transmitting, by using the first method, a third signal including information for specifying the identification information of the power transmission apparatus for the communication using the second method.

39. A non-transitory computer-readable storage medium that stores a program configured to cause a computer provided in a power receiving apparatus that is capable of performing communication using a first method and of performing communication using a second method different from the first method, and wirelessly receives a power from a power transmission apparatus to:
 receive, by using the first method, a first signal including information for specifying whether the power transmission apparatus supports a communication function using the second method;
 transmit, by using the first method, to the power transmission apparatus, a second signal to request identification information of the power transmission apparatus for the communication using the second method, based on that the information included in the received first signal represents that the power transmission apparatus supports the communication function using the second method; and
 in a case where a third signal including information for specifying the identification information of the power transmission apparatus for the communication using the second method is received by using the first method, perform the communication using the second method with the power transmission apparatus based on the identification information of the power transmission apparatus for the communication using the second method specified based on the information included in the received third signal.

40. A non-transitory computer-readable storage medium that stores a program configured to cause a computer provided in a power receiving apparatus that is capable of performing communication using a first method and of performing communication using a second method different from the first method, and wirelessly receives a power from a power transmission apparatus to:
 transmit, by using the first method, a first signal including information for specifying that the power receiving apparatus supports a communication function using the second method,
 transmit, by using the first method, to the power transmission apparatus, a second signal to request identification information of the power transmission apparatus for the communication using the second method, after transmitting the first signal, and in a case where a third signal including information for specifying the identification information of the power transmission apparatus for the communication using the second method is received by using the first method, perform the communication using the second method with the power transmission apparatus based on the identification information of the power transmission apparatus for the communication using the second method specified based on the information included in the received third signal.

41. A non-transitory computer-readable storage medium that stores a program configured to cause a computer provided in a power transmission apparatus that is capable of performing communication using a first method and of performing communication using a second method different from the first method, and wirelessly transmits a power to a power receiving apparatus to:

transmit, by using the first method, a first signal including information specifying that the power transmission apparatus supports a communication function using the communication of the second method; and based on that a second signal to request identification information of the power transmission apparatus for the communication using the second method is received by using the first method after transmitting the first signal, transmit, by using the first method, a third signal including information for specifying the identification information of the power transmission apparatus for the communication using the second method.

* * * * *